(12) United States Patent
Salgado et al.

(10) Patent No.: US 8,582,129 B2
(45) Date of Patent: Nov. 12, 2013

(54) APPARATUS AND METHOD FOR PRESENTATION OF APPLICATION PRINTING NOTES FOR A PRINTER DRIVER

(75) Inventors: David Salgado, Victor, NY (US); Alan K. Robertson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 263 days.

(21) Appl. No.: 13/036,648

(22) Filed: Feb. 28, 2011

(65) Prior Publication Data

US 2012/0218580 A1    Aug. 30, 2012

(51) Int. Cl.
*G06F 3/12*    (2006.01)

(52) U.S. Cl.
USPC .......................... 358/1.13; 717/176; 358/1.15

(58) Field of Classification Search
USPC ....................... 358/1.13, 1.15, 1.16
See application file for complete search history.

(56) References Cited

U.S. PATENT DOCUMENTS

| | | | |
|---|---|---|---|
| 5,130,806 A | 7/1992 | Reed et al. | |
| 5,524,085 A | 6/1996 | Bellucco et al. | |
| 2008/0068655 A1* | 3/2008 | Kimura | 358/1.16 |
| 2010/0182642 A1* | 7/2010 | Masuyama | 358/1.15 |
| 2011/0199640 A1* | 8/2011 | Shirai | 358/1.15 |

* cited by examiner

*Primary Examiner* — Fan Zhang
*Assistant Examiner* — Juan M Guillermety
(74) *Attorney, Agent, or Firm* — Ronald E. Prass, Jr.; Prass LLP (57) ABSTRACT

An apparatus and method present application printing notes for a printer driver. The method can be performed in an electronic device including a network interface. The method can include receiving a print driver request. The method can include obtaining an application identifier corresponding to the print driver request. The application identifier can identify a particular application for a print job. The method can include sending an application printing notes query to an application printing notes repository to access application printing notes corresponding to the application identifier. The method can include displaying information corresponding to the application printing notes.

13 Claims, 4 Drawing Sheets

APPARATUS AND METHOD FOR PRESENTATION OF APPLICATION PRINTING NOTES FOR A PRINTER DRIVER

BACKGROUND

Disclosed herein are a method and apparatus for presentation of application printing notes for a printer driver.

Presently, printing devices, such as printers, copiers, and multi-function devices, provide users the ability to print from electronic devices, such as desktop or laptop computers, handheld computers, or other electronic devices, to printing devices connected to the electronic devices. The electronic devices may be stand alone devices, or may be connected to printers and other electronic devices over a network, such as in a business, campus, or personal computing environment, that includes one or more printing devices.

In order for a printing device to interface with and function with the electronic device to which it is connected, a printing device driver is typically installed on the electronic device. A printing device driver is software that controls the printing device from the electronic device. The printing device driver may include a user interface which is typically accessed by a user through an operating system or an application program, such as a word processing program, a spreadsheet program, or other types of programs, and viewed on a display.

Unfortunately, application programs, such as word processing programs, document viewing programs, spreadsheet programs, and other programs, have many issues that can occur when printing from them. For example, printing a document with a particular document viewing program causes a color shift. Also, the particular document viewing program does not synchronize its N-Up, or number of images on a media sheet, setting with the printer driver's setting.

Customers think these issues are due to the printer driver and/or printer and call the printer vendor's Customer Support center for help, even though the issue is with the application program. Every call to the Customer Support center costs the printer vendor and reduces a product's profitability. Also, application program printing issues cause customer dissatisfaction with a printer, even though the issues lie with the application programs.

Thus, there is a need for a method and apparatus for presentation of application printing notes for a printer driver to inform users of printing issues with application programs.

SUMMARY

An apparatus and method for presentation of application printing notes for a printer driver are disclosed. The method can be performed in an electronic device including a network interface. The method can include receiving a print driver request. The method can include obtaining an application identifier corresponding to the print driver request. The application identifier can identify a particular application for a print job. The method can include sending an application printing notes query to an application printing notes repository to access application printing notes corresponding to the application identifier. The method can include displaying information corresponding to the application printing notes.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

The embodiments include a method for presentation of application printing notes for a printer driver. The method can be performed in an electronic device including a network interface. The method can include receiving a print driver request. The method can include obtaining an application identifier corresponding to the print driver request. The application identifier can identify a particular application for a print job. The method can include sending an application printing notes query to an application printing notes repository to access application printing notes corresponding to the application identifier. The method can include displaying information corresponding to the application printing notes.

The embodiments further include an apparatus for presentation of application printing notes for a printer driver. The apparatus can include a controller configured to control operations of the apparatus. The apparatus can include a user interface coupled to the controller. The user interface can be configured to receive a print driver request. The apparatus can include a printing device driver installed on the apparatus. The printing device driver can be configured to obtain an application identifier corresponding to the print driver request. The application identifier can identify a particular application for a print job. The apparatus can include a network interface configured to send an application printing notes query to an application printing notes repository to access application printing notes corresponding to the application identifier. The apparatus can include a display configured to display information corresponding to the application printing notes.

The embodiments further include a non-transitory computer readable storage medium including a computer-usable data carrier storing a printing device driver. The printing device driver, when executed by a controller, can cause the controller to control an electronic device by receiving a print driver request. The printing device driver can cause the controller to obtain an application identifier corresponding to the print driver request. The application identifier can identify a particular application for a print job. The printing device driver can cause the controller to send an application printing notes query to an application printing notes repository to access application printing notes corresponding to the application identifier. The printing device driver can cause the controller to display information corresponding to the application printing notes.

Figure 1:
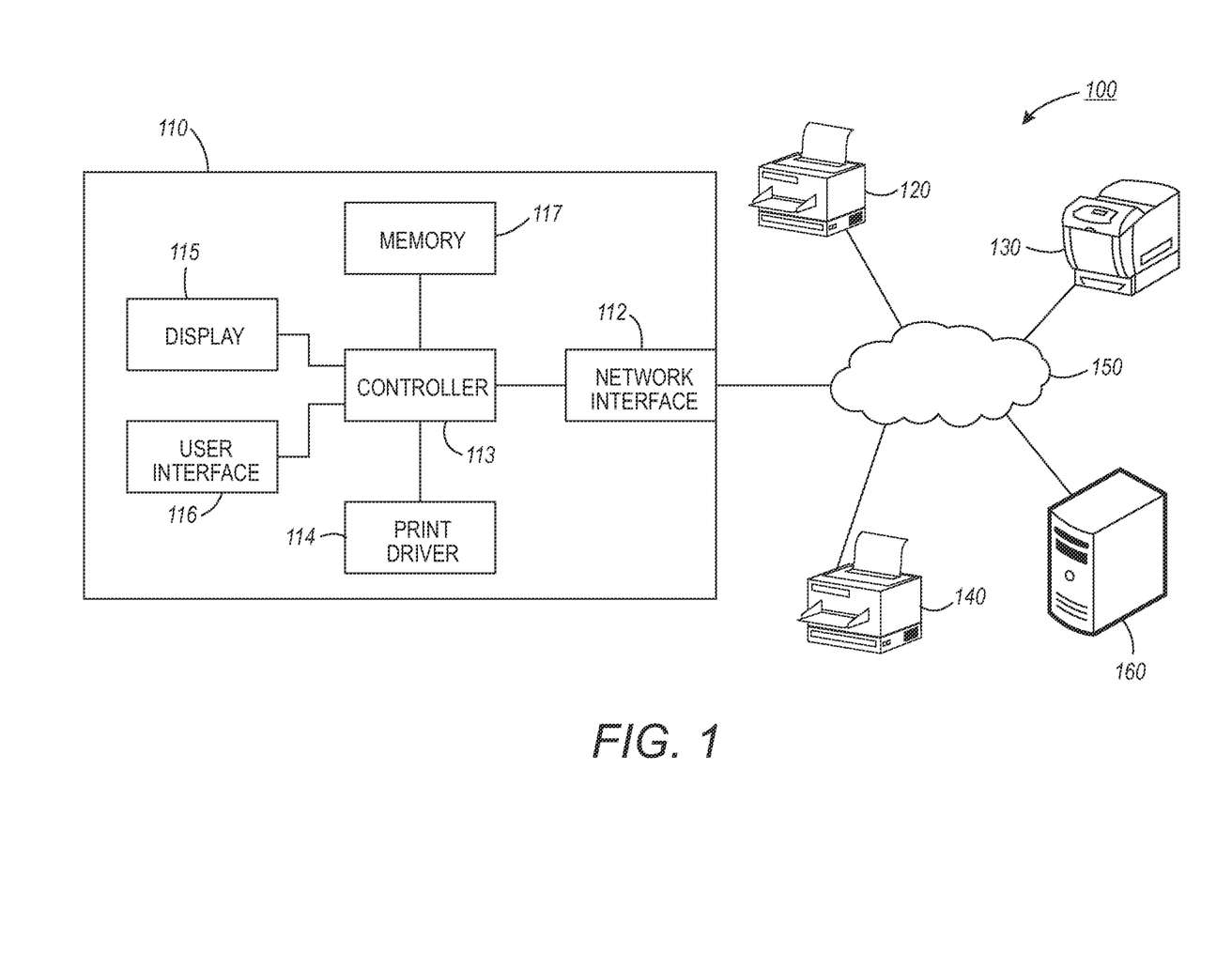
FIG. 1 illustrates an example system according to one embodiment.

FIG. 1 is an example illustration of a system 100 according to one embodiment. The system 100 can include printing devices 120, 130, and 140, at least one user terminal 110, at least one network 150, and at least one server 160. The printing devices 120, 130, and/or 140 may be printers, multifunction media devices, xerographic machines, ink jet printers, or any other devices that generate an image on media. The terminal 110, such as an electronic device, can be a desktop computer, a portable electronic device, a laptop computer, a mobile phone, a personal digital assistant, or any other electronic device.

The terminal 110 can include a network interface 112 configured to connect the terminal 110 to the network 150, configured to communicate with at least one printing device, such as the printing devices 120, 130, and/or 140, over the network 150, and/or configured to communicate with the server 160 over the network 150. The network interface 112 can be an Ethernet network connection, a Universal Serial Bus (USB) connection, a parallel port connection, a serial port connection, an 802.11-based wireless connection, a WiFi connection, a local area network connection, a wireless local area network connection, a wide area network connection, such as a cellular connection, or any connection that can connect an electronic device to a network and/or a printing device.

The terminal 110 can include a controller 113 coupled to the network interface 112. The controller 113 can be configured to control operations of the terminal 110 and can be configured to communicate over the network interface 112. The terminal 110 can include a memory 117 coupled to the controller 113. The memory 117 may include a random access memory, a read only memory, an optical memory, a hard drive, a thumb drive, a floppy disk, a compact disc, or any other memory that can be used with an electronic device.

The terminal 110 can include a printing device driver 114 installed on the terminal 110 for a printing device, such as the printer 120. A printing device driver may be provided by a party, such as a dealer or reseller, where the printing device driver can operate on printers and/or electronic devices the party does not own or control. The printing device driver 114 can be coupled to the controller 113, can reside within the controller 113, can reside within the memory 117, can be an autonomous module, can be software, can be hardware, or can be in any other format useful for a printing device driver on an electronic device.

The terminal 110 can include a user interface 116 coupled to the controller 113. The user interface 116 can include a keypad, buttons, a touch pad, a joystick, an additional display, a touch screen, or any other device useful for providing an interface between a user and an electronic device. The terminal 110 can include a display 115 coupled to the controller 113. The display 115 can be a liquid crystal display (LCD), a light emitting diode (LED) display, a plasma display, a cathode ray tube display, a touch screen display, or any other means for displaying information.

In operation, the controller 113 can control operations of the apparatus 110. The user interface 116 can receive a print driver request. The printing device driver 114 can obtain an application identifier corresponding to the print driver request. The application identifier can identify a particular application for a print job. For example, the application identifier can include a name of an application, a version of the application, and/or any other identifier of an application operating on the terminal 110. Furthermore, the application identifier can identify the particular application a user is printing from. For example, the application identifier can identify a particular word processing application, a particular document viewing application, a particular computer aided drafting application, a particular spreadsheet application, or any other application.

The network interface 112 can send an application printing notes query to an application printing notes repository to access application printing notes corresponding to the application identifier. The application printing notes repository can be located at the server 160 or elsewhere in the system 100. For example, the application printing notes repository can be stored remotely from the terminal 110 or can be stored locally on the terminal 110. As a further example, the application printing notes repository can be stored at the server 160 and the terminal 110 can access the application printing notes repository from the server 160 over the network 150. The query can include the application identifier, operating system information on the terminal 110, print driver Page Description Language (PDL) information, print driver version information, and other relevant information. The display 115 can display information corresponding to the application printing notes.

The application identifier can be obtained from the particular application for the print job. For example, the print driver 114 can obtain the application identifier in response to receiving the print driver request. The application identifier can also be included in the print driver request or may be obtained external to the print driver request.

The printing device driver 114 can retrieve, from the application printing notes repository, application printing notes corresponding to the application identifier. The display 115 can display the application printing notes. Also, the printing device driver 114 can retrieve, from the application printing notes repository, application printing notes data corresponding to the application identifier. Application printing notes are defined as informative information to improve printing from a corresponding application that is a source of a print job. For example, application printing notes can include, a set of known issues and/or workarounds, can include notes related to a particular printing device, and/or can include other notes relative to printing from a particular application using a printing device driver. The application printing notes data can be included in data sent across the network 150 or retrieved from the memory 117. The application printing notes data can also be included in a file useful for displaying application printing notes, such as a text file, a document file, a database file, or any other file or method of obtaining information. For example, the application printing notes can be obtained from html data, pdf data, xml data, or other data. The application printing notes can be displayed in a driver sub-window, in an Internet browser, in a driver pop-up window, or can be otherwise displayed on the electronic device. As a further example, the application printing notes can be displayed in a driver window that displays Internet browser information in a format that mimics the appearance of the driver window.

The printing device driver 114 can retrieve, from the application printing notes repository, a link to application printing notes corresponding to the application identifier. For example, the link can be a uniform resource identifier, such as a uniform resource locator, for accessing the application printing notes. The printing device driver 114 can retrieve, using the link, the application printing notes. The display 115 can then display the application printing notes.

The display 115 can display an application printing notes icon for the application printing notes. The user interface 116 can receive, from a user, a selection of the application printing notes icon. The display 115 can then display the application printing notes in response to receiving the selection of the application printing notes icon. Different application printing notes icons can be used for different purposes. For example, a single application printing notes icon may be used to cover all possible printing issues for a particular application. As another example, different application printing notes icons can be displayed next to different relevant features to tie particular application printing notes to particular features. The different features can include a 2-sided printing feature, a secure print feature, a color print feature, a print quality feature, and other printing features and options. Thus, the application printing notes can be based on a printing feature basis and/or can be based on a complete driver basis. The printing device driver 114 can retrieve, from the application printing notes repository, application printing notes corresponding to the application identifier in response to receiving the selection of the application printing notes icon.

The application printing notes can include notes regarding printing a print job corresponding to the particular application. For example, the application printing notes can include explanations of issues or problems relating to printing from the particular application using a given print driver and/or printer. The application printing notes can also include explanations of workarounds regarding issues or problems printing from the particular application using a given print driver and/or printer. The application printing notes can also include other notes regarding printing from the particular application using a given print driver and/or printer.

The memory 117 can be a non-transitory computer readable storage medium, such as a hard drive, a solid state hard drive, a thumb drive, a floppy disk, a compact disc, or any other non-transitory computer readable storage medium. For example, the non-transitory computer readable storage medium can be a computer-usable data carrier storing a printing device driver 114 for a first printing device. The printing device driver 114, when executed by the controller 113, can cause the controller 113 to control the terminal 110 by receiving a print driver request. The printing device driver 114 can cause the controller 113 to control the terminal 110 by obtaining an application identifier corresponding to the print driver request. The application identifier can identify a particular application for a print job. The printing device driver 114 can cause the controller 113 to control the terminal 110 by sending an application printing notes query to an application printing notes repository to access application printing notes corresponding to the application identifier. The printing device driver 114 can cause the controller 113 to control the terminal 110 by retrieving, from the application printing notes repository, application printing notes corresponding to the application identifier. The printing device driver 114 can cause the controller 113 to control the terminal 110 by displaying information corresponding to the application printing notes, such as by displaying the application printing notes.

Embodiments can provide a method for displaying application notes in a printer driver. A repository of application notes can be maintained by a printer vendor. A printer driver, such as the printing device driver 114, can query the repository and obtain, for example, a Uniform Resource Locator (URL) to browser-displayable information for application notes for the application the user is printing from. The printer driver can present an "application notes" icon that upon selection can display the application notes URL in a browser window. Embodiments can reduce customer service calls, can provide the ability to communicate application issues/workarounds to customers so they can avoid problems printing, can add new content to the application notes repository with the new content being accessible to the printer driver when it is next used, and can provide other benefits.

Embodiments can provide a printer driver that displays application notes to the user for the application from which the user will be printing. Embodiments can provide a general mechanism for enabling the display of application notes. For example, when a user selects the print option in an application's menu, the operation system can bring up its print dialog. In the operation system's print dialog, the user can specify the printer to print to. If the user wants to specify printing features, the user can open the printer driver's user interface. The opening of the printer driver can cause the printer driver to access an external application note's repository, which can be defined with a URL. The printer driver can obtain the application's name and version and can query the application note's repository to see if there are any application notes for this particular application version. If there are application notes, the repository can return a URL to a browser-displayable file, such as a HyperText Markup Language (HTML) file, that can contain details of the application notes for the particular version of the application.

When there are application notes, the printer driver can display an "application notes" icon near the printer driver's help icon. As with the help icon, the "application notes" icon can appears in the same location on every tab. When the user selects the "application notes" icon, the printer driver can display the application notes within a browser window. Each application note can contain an explanation of the issue or problem and can contain workarounds that the user can employ to get around the issue.

Embodiments can provide a printer driver that can also include its display language in the query to the application notes repository. The URL returned by the repository can be for the application note's browser-displayable file in that language. If no translation exists for that language, the repository can return the URL for the English version. Embodiments can also provide a repository query, or the display of the application note's URL, which can include the client's operating system, printer driver's PDL, driver version, and other relevant information pieces. These information pieces can be used to further refine the application note's information obtained.

Embodiments can provide for the printer driver's acquisition of the application notes from the repository, such as by using a simple parameterized URL or a web service. However, the printer driver's display of application notes is not limited to browser-based representations only and can use other formats.

Embodiments can provide a variation where the printer driver highlights when there is new application data for a particular application program. For example, the printer driver may blink the application notes multiple times initially or provide a control window containing an "only show me when new application note occurs" option for the application printing notes icon.

Embodiments can also provide an application notes repository that can be hosted within a customer's site with the printer driver containing a field specifying the repository's location. For customer-located repository's, a customer can add, delete, and modify application notes in the repository. The customer can also add application notes for new application programs not presently in the repository to provide information on any issues with a customized application program they have.

A sample query using the Extended BASIC Development System (XBDS) format to obtain the application notes for a fictional application called Photoapplication C2 can be formatted as follows:

https://www.printvendor.com/print-drivers/get-application-notes?language=en-us&application=photoapplication&version=c2

This query can return issues including:

Issue1: In PostScript printer driver, turning off PostScript pass-through mode prints out as black-and-white.

Workaround: 1. Turn on PostScript pass-through when printing a color document; or 2. Print document using the PCL 6 printer driver.

Issue2: When faxing a letter size document, the output image is clipped.

Workaround: In the printer driver, specify the output paper size to be 8×10.5". The printer driver will reduce the image so that no clipping occurs.

Embodiments can pro-actively provide a user information on potential application-related issues with workarounds prior to printing a job. Embodiments can reduce calls to a printer vendor Customer Support center by avoiding application issues. The call reduction can correspond to cost savings for the printer vendor. Embodiments can provide an application notes repository that is external to the printer driver and additional application notes can be added independent of the printer driver and can show up when the printer driver is next used. Embodiments can provide customer-hosted repositories that allow system administrators to provide application hints for their user base.

Figure 2:
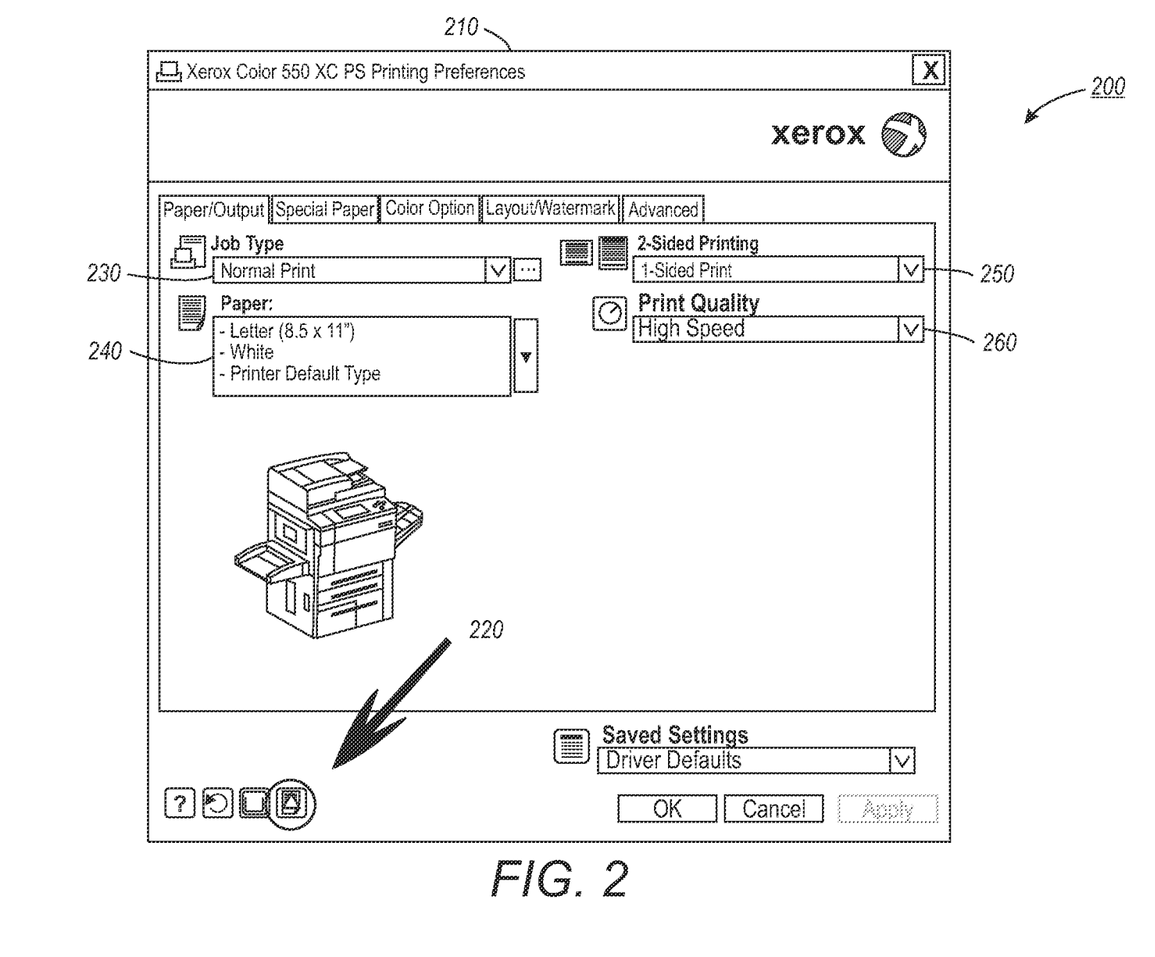
FIG. 2 illustrates an example display showing a printer driver screen according to one embodiment.

FIG. 2 illustrates an example display 200 showing a printer driver screen 210 according to one according to one embodiment. The printer driver screen 210 can include a job type option field 230, a paper type option field 240, a 2-sided printing option field 250, a print quality option field 260, and other options and information. The printer driver screen 210 can also include an application notes icon 220. The application notes icon 220 can be located next to a help icon or elsewhere on the printer driver screen 210. The printer driver screen 210 can also include multiple application notes icons 220 that can be located next to different displayed options and information when application notes are relevant to the displayed options and information. A user can select the application notes icon 220 to obtain application printing notes for the application the user is printing from.

Figure 3:
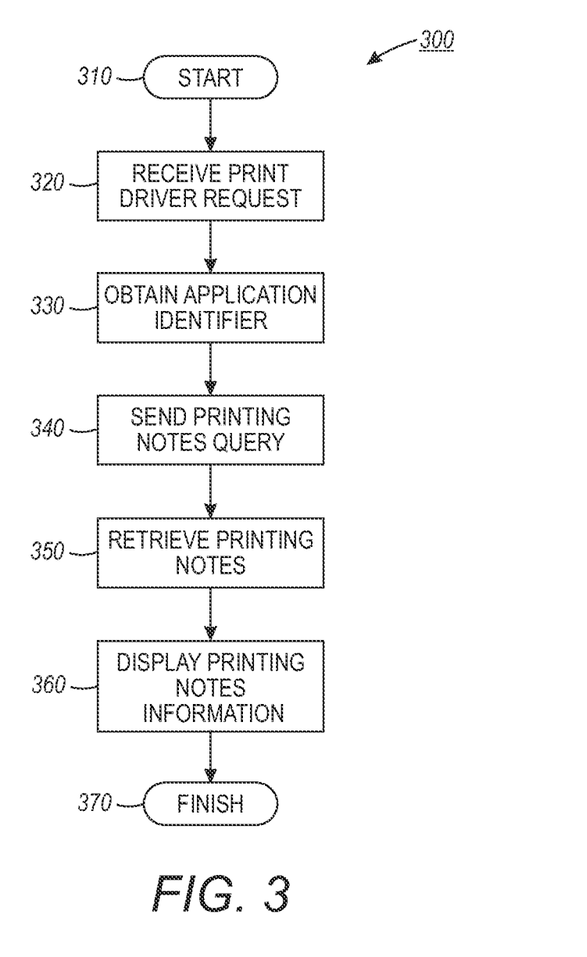
FIG. 3 illustrates an example flowchart of a method of presentation of application printing notes for a printer driver for an electronic device according to one embodiment.

FIG. 3 illustrates an example flowchart 300 of a method of presentation of application printing notes for a printer driver for an electronic device, such as the terminal 110, including a network interface according to one embodiment. The method can start at 310. At 320, a print driver request can be received. At 330, an application identifier corresponding to the print driver request can be obtained. The application identifier can identify a particular application for a print job. The application identifier can be obtained from the particular application for the print job. At 340, an application printing notes query can be sent to an application printing notes repository to access application printing notes corresponding to the application identifier.

At 350, application printing notes corresponding to the application identifier can be retrieved from the application printing notes repository. For example, application printing notes data corresponding to the application identifier can be retrieved from the application printing notes repository. As a further example, a link to application printing notes corresponding to the application identifier can be retrieved, from the application printing notes repository. Then, the application printing notes can be retrieved using the link. The application printing notes can include notes regarding printing a print job corresponding to the particular application. At 360, information corresponding to the application printing notes can be displayed. For example, the application printing notes can be displayed or other relevant information can be displayed. At 370, the method can end.

According to some embodiments, all of the blocks of the flowchart 300 are not necessary. Additionally, the flowchart 300 or blocks of the flowchart 300 may be performed numerous times, such as iteratively. For example, the flowchart 300 may loop back from later blocks to earlier blocks. Furthermore, many of the blocks can be performed concurrently, in parallel processes, or out of order.

Figure 4:
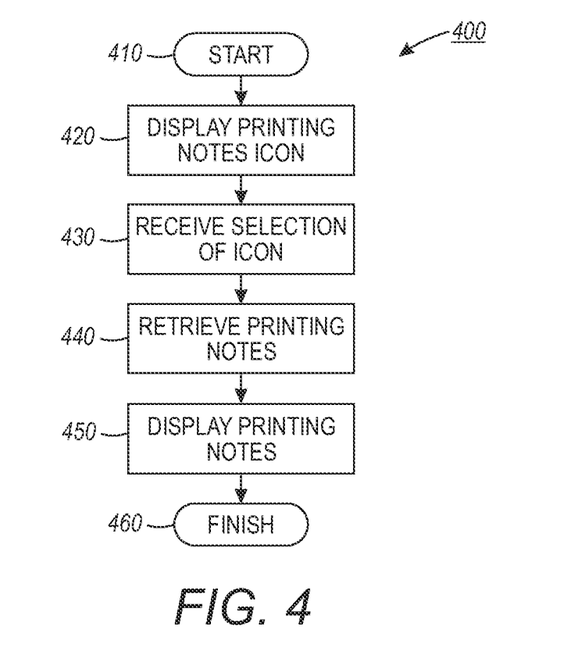
FIG. 4 illustrates an example flowchart of a method of presentation of application printing notes for a printer driver for an electronic device according to one embodiment.

FIG. 4 illustrates an exemplary flowchart 400 of a method of presentation of application printing notes for a printer driver for an electronic device, such as the terminal 110, including a network interface according to one embodiment. The flowchart 400 can be combined into the flowchart 300. The method can start at 410. At 420, an application printing notes icon for the application printing notes can be displayed. At 430, a selection of the application printing notes icon can be received from a user. At 440, application printing notes corresponding to an application identifier can be retrieved from an application printing notes repository in response to receiving the selection of the application printing notes icon. At 450, the application printing notes can be displayed. At 460, the method can end.

According to some embodiments, all of the blocks of the flowchart 400 are not necessary. Additionally, the flowchart 400 or blocks of the flowchart 400 may be performed numerous times, such as iteratively. For example, the flowchart 400 may loop back from later blocks to earlier blocks. Furthermore, many of the blocks can be performed concurrently or in parallel processes.

Figure 5:
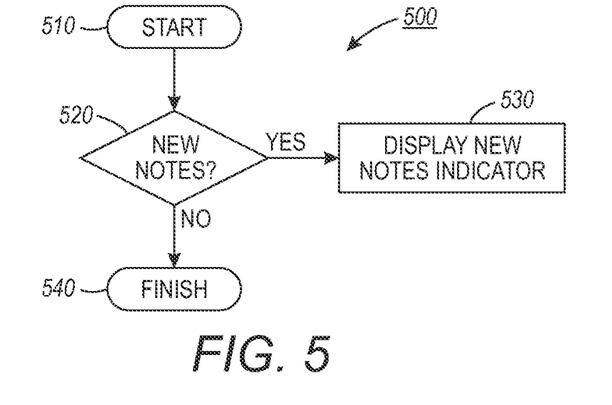
FIG. 5 illustrates an example flowchart of a method of presentation of application printing notes for a printer driver for an electronic device according to one embodiment.

FIG. 5 illustrates an exemplary flowchart 500 of a method of presentation of application printing notes for a printer driver for an electronic device, such as the terminal 110, including a network interface according to one embodiment. The flowchart 500 can be combined into the flowchart 300. The method can start at 510. At 520, a determination can be made as to whether there is new application note information. If there is new application note information, at 530, a new application note information indicator can be displayed. The new application note information indicator can indicate there is new application note information. At 540, the method can end.

According to some embodiments, all of the blocks of the flowchart 500 are not necessary. Additionally, the flowchart 500 or blocks of the flowchart 500 may be performed numerous times, such as iteratively. For example, the flowchart 500 may loop back from later blocks to earlier blocks. Furthermore, many of the blocks can be performed concurrently or in parallel processes.

Embodiments may be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in an electronic device including a network interface, the method comprising:
   receiving a print driver request;
   obtaining an application identifier corresponding to the print driver request, the application identifier identifying a particular application for a print job;
   sending an application printing notes query to an application printing notes repository to access application printing notes corresponding to the application identifier, the application printing notes including a set of known issues, workarounds, notes related to a particular printing device, and notes relative to printing from a particular application using a print driver specified in the print driver request;
   retrieving, from the application printing notes repository, a Uniform Resource Locator (URL) link to application printing notes corresponding to the obtained application identifier;
   retrieving, using the URL, the application printing notes; and
   displaying the application printing notes.

2. The method according to claim 1, wherein the application identifier is obtained from the particular application for the print job.

3. The method according to claim 1,
   the displaying comprising displaying an application printing notes icon for the application printing notes,
   the method further comprising:
   receiving, from a user, a selection of the application printing notes icon; and
   displaying the application printing notes in response to the receiving of the selection of the application printing notes icon.

4. The method according to claim 3, further comprising retrieving, from the application printing notes repository, the application printing notes corresponding to the application identifier in response to receiving the selection of the application printing notes icon.

5. The method according to claim 1,
   wherein the application identifier identifies a particular application that is a source for the print job from an electronic device, and
   wherein the application printing notes include notes regarding printing a print job corresponding to the particular application.

6. The method according to claim 1, further comprising determining there is new application note information,
   wherein displaying information comprises displaying a new application note information indicator that indicates there is new application note information.

7. An apparatus comprising:
   a controller configured to control operations of the apparatus;
   a user interface coupled to the controller, the user interface configured to receive a print driver request;
   a printing device driver installed on the apparatus, the printing device driver being configured to obtain an application identifier corresponding to the print driver request, the application identifier identifying a particular application for a print job;
   a network interface configured to
      send an application printing notes query to an application printing notes repository to access application printing notes corresponding to the application identifier, the application printing notes including a set of known issues, workarounds, notes related to a particular printing device, and notes relative to printing from a particular application using a print driver specified in the print driver request,
      retrieve, from the application printing notes repository, a Uniform Resource Locator (URL) link to application printing notes corresponding to the obtained application identifier, and
      retrieve, using the URL, the application printing notes; and
   a display configured to display the application printing notes.

8. The apparatus according to claim 7, wherein the application identifier is obtained from the particular application for the print job.

9. The apparatus according to claim 7,
   wherein the display is configured to display an application printing notes icon for the application printing notes,
   the user interface is configured to receive, from a user, a selection of the application printing notes icon, and
   the display is further configured to display the application printing notes in response to receiving the selection of the application printing notes icon.

10. The apparatus according to claim 9, wherein the printing device driver is configured to retrieve, from the application printing notes repository, the application printing notes corresponding to the application identifier in response to receiving the selection of the application printing notes icon.

11. The apparatus according to claim 7, wherein the application printing notes include notes regarding printing a print job corresponding to the particular application.

12. The apparatus according to claim 7,
wherein the printing device driver is configured to determine there is new application note information, and
the display is configured to display information by displaying a new application note information indicator that indicates there is new application note information.

13. A non-transitory computer readable storage medium comprising a computer-usable data carrier storing a printing device driver, the printing device driver, when executed by a controller, causing the controller to control an electronic device by:

receiving a print driver request;

obtaining an application identifier corresponding to the print driver request, the application identifier identifying a particular application for a print job;

sending an application printing notes query to an application printing notes repository to access application printing notes corresponding to the application identifier, the application printing notes including a set of known issues, workarounds, notes related to a particular printing device, and notes relative to printing from a particular application using a print driver specified in the print driver request;

retrieving, from the application printing notes repository, a Uniform Resource Locator (URL) link to application printing notes corresponding to the obtained application identifier;

retrieving, using the URL, the application printing notes; and displaying the application printing notes.

* * * * *